(12) United States Patent
Ohrbom et al.

(10) Patent No.: US 7,160,973 B2
(45) Date of Patent: *Jan. 9, 2007

(54) URETHANE POLYMERS THAT REDUCE THE EFFECT OF POLYLACTONE LINKAGES

(75) Inventors: Walter H. Ohrbom, Hartland Township, MI (US); Craig S. Schang, Brighton, MI (US); Joanne Casale, Warren, MI (US); Thaddeus J. Lepkowski, Dearborn Heights, MI (US)

(73) Assignee: BASF Corporation, Southfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/317,942

(22) Filed: Dec. 12, 2002

(65) Prior Publication Data

US 2003/0114628 A1 Jun. 19, 2003

Related U.S. Application Data

(60) Provisional application No. 60/341,469, filed on Dec. 17, 2001.

(51) Int. Cl.
  C08G 18/30 (2006.01)
  C08G 18/28 (2006.01)
  C08G 18/08 (2006.01)
  C08L 75/00 (2006.01)
  C09D 175/00 (2006.01)

(52) U.S. Cl. .................. 528/44; 525/123; 525/440; 525/452; 525/453; 525/454; 525/455; 525/457; 525/458; 525/467; 525/474; 528/49; 528/68; 528/85

(58) Field of Classification Search ............ 528/44, 528/49, 68, 85; 525/123, 440, 452, 453, 525/454, 455, 457, 458, 467, 474
See application file for complete search history.

(56) References Cited

U.S. PATENT DOCUMENTS

| 5,089,617 A | 2/1992 | Forgione et al. ............ 544/196 |
| 5,300,328 A | 4/1994 | Rehfuss ................. 427/388.3 |
| 5,336,566 A | 8/1994 | Rehfuss .................... 428/524 |
| 5,356,669 A | 10/1994 | Rehfuss et al. .......... 427/407.1 |
| 5,373,069 A | 12/1994 | Rehfuss et al. ............ 525/456 |
| 5,451,656 A | 9/1995 | Menovcik et al. .......... 528/288 |
| 5,474,811 A | 12/1995 | Rehfuss et al. .......... 427/407.1 |
| 5,508,379 A | 4/1996 | Menovcik et al. .......... 528/367 |
| 5,512,639 A | 4/1996 | Rehfuss et al. ............ 525/456 |
| 5,532,061 A | 7/1996 | Menovcik et al. ....... 428/423.1 |
| 5,605,965 A | 2/1997 | Rehfuss et al. ............ 525/100 |
| 5,639,828 A | 6/1997 | Briggs et al. .............. 525/208 |
| 5,659,003 A | 8/1997 | Menovcik et al. ........... 528/73 |
| 5,665,433 A | 9/1997 | Moussa et al. ............. 427/377 |
| 5,693,723 A | 12/1997 | Green .................... 525/481 |
| 5,693,724 A | 12/1997 | Green .................... 525/481 |
| 5,723,552 A | 3/1998 | Menovcik et al. .......... 525/453 |
| 5,726,244 A | 3/1998 | McGee et al. ................ 525/78 |
| 5,726,246 A | 3/1998 | Rehfuss et al. ............ 525/100 |
| 5,726,274 A | 3/1998 | Menovcik et al. ............ 528/85 |
| 5,744,550 A | 4/1998 | Menovcik et al. .......... 525/162 |
| 5,756,213 A | 5/1998 | Ohrbom et al. ............. 428/412 |
| 5,760,127 A | 6/1998 | Bammel et al. ............ 524/590 |
| 5,766,769 A | 6/1998 | Ohrbom et al. .......... 428/423.1 |
| 5,770,650 A | 6/1998 | McGee et al. .............. 524/590 |
| 5,777,048 A | 7/1998 | Ohrbom et al. ............. 525/509 |
| 5,792,810 A | 8/1998 | Menovcik et al. .......... 524/590 |
| 5,827,930 A | 10/1998 | Ohrbom et al. ............. 525/440 |
| 5,852,136 A | 12/1998 | Green .................... 525/456 |
| 5,854,385 A | 12/1998 | McGee et al. .............. 528/369 |
| 5,866,259 A | 2/1999 | Harris et al. ............... 428/24.4 |
| 5,872,195 A | 2/1999 | Green et al. ............... 525/481 |
| 5,888,655 A | 3/1999 | Harris et al. ............ 428/423.1 |
| 5,907,024 A * | 5/1999 | Ohrbom et al. ............. 528/75 |
| 5,989,642 A | 11/1999 | Singer et al. ............ 427/407.1 |
| 5,994,479 A | 11/1999 | Green et al. ............... 525/481 |
| 6,040,062 A | 3/2000 | McGee et al. .............. 428/500 |
| 6,080,825 A | 6/2000 | Ohrbom et al. ............. 525/481 |
| 6,084,038 A | 7/2000 | Ohrbom et al. ............. 525/481 |
| 6,114,444 A | 9/2000 | Rehfuss et al. ............ 525/101 |
| 6,160,058 A | 12/2000 | Ohrbom et al. ............. 525/481 |
| 6,165,618 A | 12/2000 | Ohrbom et al. .......... 428/423.1 |
| 6,245,855 B1 | 6/2001 | Searup et al. ............. 525/157 |
| 6,303,690 B1 | 10/2001 | December et al. .......... 525/163 |
| 6,844,395 B1 * | 1/2005 | Ohrbom et al. ............. 524/590 |

FOREIGN PATENT DOCUMENTS

| CA | 2108 990 | 4/1994 |
| CA | 2187 222 | 4/1997 |
| EP | 0 780 455 | 6/1997 |
| EP | 832 950 | 4/1998 |
| EP | 0 869 139 | 10/1998 |
| WO | WO 87/00851 | 2/1987 |
| WO | WO 00/36028 | 6/2000 |
| WO | WO02/102872 | 12/2002 |

* cited by examiner

Primary Examiner—Rabon Sergent

(57) ABSTRACT

A composition comprising a reaction product of a diisocyanate, a chain extension agent having at least difunctional reactivity with an isocyanate, and a material comprising a blend of i) a primary carbamate material having at least one functional group reactive with an isocyanate and at least one primary carbamate group or a group convertible to a primary carbamate group, and ii) a reaction product of the primary carbamate material with an extending agent, wherein at least one of i) the isocyanate groups of the diisocyanate have a different reactivity in relation to each other, and ii) at least two of the groups with reactivity with an isocyanate on the chain extension agent have a different reactivity in relation to each other.

32 Claims, No Drawings

URETHANE POLYMERS THAT REDUCE THE EFFECT OF POLYLACTONE LINKAGES

CROSS REFERENCE TO RELATED APPLICATIONS

This application is a non-provisional application of U.S. Ser. No. 60/341,469 filed on Dec. 17, 2001, which is incorporated herein by reference.

FIELD OF THE INVENTION

The present invention relates to urethane polymers.

BACKGROUND OF THE INVENTION

Curable, or thermosettable, coating compositions are widely used in the coatings art, particularly for topcoats in the automotive and industrial coatings industry. Color-plus-clear composite coatings are particularly useful as topcoats for which exceptional gloss, depth of color, distinctness of image, or special metallic effects are desired. The automotive industry has made extensive use of these coatings for automotive body panels.

Single-layer topcoats and the clearcoats of color-plus-clear composite coatings, however, require an extremely high degree of clarity and gloss to achieve the desired visual effect. Such coatings also require a low degree of visual aberrations at the surface of the coating in order to achieve the desired visual effect such as high distinctness of image (DOI). As such, these coatings are especially susceptible to a phenomenon known as environmental etch. Environmental etch manifests itself as spots or marks on or in the finish of the coating that often cannot be rubbed out. It is often difficult to predict the degree of resistance to environmental etch that a high gloss topcoat or color-plus-clear composite coating will exhibit. Many coating compositions known for their durability and/or weatherability when used in exterior paints, such as known high-solids enamels, do not provide the desired level of resistance to environmental etch when used in high gloss coatings such as the clearcoat of a color-plus-clear composite coating. Curable coating compositions based on curable components having carbamate or urea functionality have been proposed have been described in the art to provide etch-resistant coatings, e.g., U.S. Pat. Nos. 5,356,669; 5,373,069; 5,854,385; and 6,245,855.

Various compositions have been proposed to meet the above requirements for use as the topcoat coating or as the clearcoat of a color-plus-clear composite coating, including polyurethanes, acid-epoxy systems and the like. However, many prior art systems suffer from disadvantages such as coatability problems, marginal compatibility with the pigmented basecoat, solubility problems, and marginal appearance. Moreover, while one-pack compositions are preferred to two-pack compositions (in which the reactive component must be separated before application to prevent premature reaction), very few one-pack coating compositions have been found that provide satisfactory resistance to environmental etch, especially in the demanding environment of automotive coatings.

In addition, it is desirable to provide coatings with a good combination of properties such as durability, hardness, flexibility, resistance to scratching and marring, and chemical resistance. It is also desirable to reduce the amount of solvent required in coating compositions in order to reduce the volatile organic content (VOC), which is better for the environment. Scratch and mar resistance is the ability of a coating to resist damage caused by abrasion of the coating.

In the past, it has been difficult to formulate a coating that combines good etch resistance with scratch and marring resistance while maintaining flexibility and low VOC.

Curable coating compositions utilizing carbamate-functional resins are described, for example, in U.S. Pat. Nos. 6,245,855; 6,160,058; 6,165,618; 6,144,444; 6,084,038; 6,080,825; 6,040,062; 5,994,479; 5,888,655; 5,872,195; 5,866,259; 5,854,385; 5,852,136; 5,827,930; 5,792,810; 5,777,048; 5,770,650; 5,766,769; 5,760,127; 5,756,213; 5,744,550; 5,726,274; 5,726,246; 5,726,244; 5,723,552; 5,693,724; 5,693,723; 5,659,003; 5,639,828; 5,532,061; 5,512,639; 5,508,379; 5,474,811; 5,451,656; 5,373,069; 5,356,669; 5,336,566; and 5,300,328 each of which is incorporated herein by reference, and U.S. application Ser. No. 08/719,670, filed Sep. 25, 1996 (EP832950), now abandoned, 08/166,277, filed Dec. 13, 1993, now abandoned, 08/339,999, filed Nov. 15, 1994, now abandoned 09/211, 598, filed Dec. 14, 1998 (WO0036028), now abandoned, 07/965,509, filed Oct. 23, 1992 (CA2108990), now abandoned, and 08/540,276, filed Oct. 6, 1995, now abandoned, and 08/698,525 filed Oct. 6, 1995 (CA2187222), now U.S. Pat. No. 6,498,266 each of which is incorporated herein by reference. These coating compositions can provide significant etch advantages over other coating compositions, such as hydroxy-functional acrylic/melamine coating compositions. It may often be desirable, however, to provide still further improvements in the above-described coating properties.

In addition to etch resistance, mar resistance is a desired property for a coating. Mar resistance is the ability of a coating to resist damage caused by abrasion of the coating. Obtaining desired performance for either etch resistance or mar resistance tends to detract from the performance of the other characteristic. Polycaprolactone structures in a polymer can improve scratch and mar resistance in a coating formed from the polymer and decrease the VOC. Increasing the amount of polycaprolactone to improve mar resistance decreases the etch resistance for the coating because of unstable ester links. Substituting for the polycaprolactone can also improve UV durability. Generally, products that have good etch resistance have bad scratch and mar resistance and high VOC, and vice versa. It would be desirable to achieve optimal performance for all properties.

SUMMARY OF THE INVENTION

The present invention relates to a composition comprising a reaction product of a diisocyanate, a chain extension agent having at least difunctional reactivity with an isocyanate, and a material comprising a blend of i) a primary carbamate material having at least one functional group reactive with an isocyanate and at least one primary carbamate group or a group convertible to a primary carbamate group and ii) a reaction product of the primary carbamate material with an extending agent, wherein at least one of i) the isocyanate groups of the diisocyanate have a different reactivity in relation to each other, and ii) at least two of the groups with reactivity with an isocyanate on the chain extension agent have a different reactivity in relation to each other.

Additionally, the present invention relates to a method comprising reacting a diisocyanate, a chain extension agent having at least difunctional reactivity with an isocyanate, and a material comprising a blend of i) a primary carbamate material having at least one functional group reactive with an isocyanate and at least one primary carbamate group or a group convertible to a primary carbamate group and ii) a reaction product of the primary carbamate material with an extending agent, wherein at least one of i) the isocyanate groups of the diisocyanate have a different reactivity in relation to each other, and ii) at least two of the groups with reactivity with an isocyanate on the chain extension agent have a different reactivity in relation to each other, and wherein the reacting is one of: a) reacting the diisocyanate, the chain extension agent, and the material together in one reaction, b) reacting the diisocyanate with the chain extension agent to form a reaction product A, and then reacting reaction product A with the material, and c) reacting the material with the diisocyanate to form a reaction product B, and then reacting reaction product B with the chain extension agent.

DETAILED DESCRIPTION

As used throughout, ranges are used as a shorthand for describing each and every value that is within the range. Any value within the range can be selected as the terminus of the range.

The present invention relates to a composition comprising a reaction product of a diisocyanate, a chain extension agent having at least difunctional reactivity with an isocyanate, and a material comprising a blend of i) a primary carbamate material having at least one functional group reactive with an isocyanate and at least one primary carbamate group or a group convertible to a primary carbamate group, and ii) a reaction product of the primary carbamate material with an extending agent, wherein at least one of i) the isocyanate groups of the diisocyanate have a different reactivity in relation to each other, and ii) at least two of the groups with reactivity with an isocyanate on the chain extension agent have a different reactivity in relation to each other.

The primary carbamate material can be any material that has at least one functional group that is reactive with an isocyanate and at least one primary carbamate group or a group that is convertible to a primary carbamate group. The functional group that is reactive with an isocyanate group includes, but is not limited to, a hydroxyl group, an amine group, and a thiol group. A preferred functional group is a hydroxyl group. A preferred primary carbamate material has a primary carbamate group and a hydroxy group, which is separated from the primary carbamate group by at least two carbon atoms. A preferred primary carbamate material of this type is a hydroxyalkyl carbamate. A preferred hydroxyalkyl carbamate is represented by the following structure:

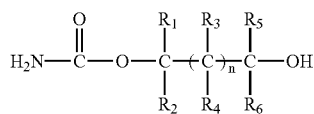

wherein $R_1$, $R_2$, $R_3$, $R_4$, $R_5$, and $R_6$ are each independently H or $C_1$–$C_6$ alkyl, and n is 0 or a positive integer. Preferably, $R_1$, $R_2$, $R_3$, $R_4$, $R_5$, and $R_6$ are each independently H or $C_1$–$C_4$ alkyl. Examples of primary carbamate materials include, but are not limited to, hydroxy ethyl carbamate, hydroxy propyl carbamate, and hydroxy butyl carbamate. A preferred hydroxyalkyl carbamate is hydroxypropyl carbamate, which is at least one of 2-hydroxy propyl-1-carbamate, 1-hydroxy propyl-2-carbamate, and 3-hydroxypropyl carbamate. Hydroxy butyl carbamate includes, but is not limited to, 1-hydroxy butyl-2-carbamate, 2-hydroxy butyl carbamate, and 4-hydroxybutyl carbamate.

The group convertible or capable of converting to a primary carbamate group can form a primary carbamate after the reaction of the primary carbamate material with the asymmetrical diisocyanate is completed. These types of primary carbamate materials include, but are not limited to, hydroxy-containing cyclic carbonate compounds, such as glycerine carbonate, which are convertible to primary carbamate by reaction with ammonia (e.g., the reaction product of glycidol and $CO_2$), monoglycidyl ethers (e.g., glycidyl propyl ether convertible to primary carbamate by reaction with $CO_2$ and then ammonia), allyl alcohols where the alcohol group is reactive with NCO and the double bond can be converted to primary carbamate by reaction with peroxide, and vinyl esters where the ester group is reactive with NCO and the vinyl group can be converted to primary carbamate with reaction with peroxide, then $CO_2$, and then ammonia. Also suitable as the primary carbamate material are compounds having a primary carbamate group as well as a group that can be converted into a primary carbamate. The primary carbamate group can then react with the isocyanate group to form an allophanate. The primary carbamate-convertible group can then be converted into a primary carbamate. An example of such a compound is allyl carbamate. In another example, the isocyanate can be reacted with a diol or amino alcohol to form a urethane or urea compound with terminal or pendant hydroxy groups. The terminal or pendant hydroxy groups can then be transformed into primary carbamate groups using known techniques, such as the reaction with phosgene then ammonia, or by transcarbamation with an alkyl or ether carbamate.

At least a portion of the material is provided as a reaction product of the primary carbamate material and an extending agent to form a prepolymer. The extending agent is any material that is reactive with the at least one functional group that is reactive with an isocyanate in the primary carbamate material and will polymerize in a head to tail arrangement with monomer units. When the functional group is hydroxy, the chain extension agent includes, but is not limited to, lactones and hydroxy carboxylic acids. Preferred lactones are ε-caprolactone and butyl lactone. A preferred carboxylic acid is 12-hydroxydodenanoic acid. In the prepolymer, there can be any number of extending agents connected to each other per carbamate. In the following ranges, the numbers listed are based on an average of all molecules in a given sample. Preferably there are from 1 to about 20 extending agents connected to each other per carbamate. Preferably, in the prepolymer, there are from 1 to about 6 extending agents connected to each other per primary carbamate material. More preferably, there are 1 to about 3 extending agents connected to each other per primary carbamate material. More preferably, there are about 2 extending agents connected to each other per primary carbamate material. More preferably, there are about 1.5 extending agents connected to each other per primary carbamate material. Even more preferably, there is one extending agent per primary carbamate material. A preferred prepolymer has the structure HAC-(extending agent)$_n$—OH, wherein HAC is hydroxy alkyl carbamate or a group that can be converted to a primary carbamate, and n is a number that is at least 1.

In the blend of the primary carbamate material with the prepolymer in a preferred embodiment, the primary carbamate material is about 10% to about 90% of the blend based on the equivalents of primary carbamate groups. More preferably, the primary carbamate is about 40–90% of the blend based on the equivalents of the primary carbamate groups. Even more preferably, the primary carbamate material is about 60% to about 90% of the blend based on the equivalents of the primary carbamate group.

The diisocyanate can be any isocyanate. The diisocyanate is provided in its monomeric form and not as a dimer, trimer, homopolymer, or as a polyurethane prepolymer of the diisocyanate. The isocyanate groups on the diisocyanate can have the same reactivity with respect to each other, or they can have different reactivity with respect to each other. The reactivity with respect to each other for the isocyanates can be determined by the degree and nature of the substitution on the carbon atom that the isocyanate is attached to. Isocyanates that are attached to carbons with the same degree and type of substitution will have similar reactivity with respect to each other. That is when the carbon atoms are both primary, both secondary, or both tertiary, the reactivity of the two isocyanates will be about the same. When the isocyanates are attached to carbon atoms that are not the same with respect to each other and/or their type of substitutions are different (i.e., aromatic versus aliphatic), their reactivity will be different. An example of a diisocyanate having the same reactivity between the isocyanates is a linear aliphatic containing at least 4 carbon atoms, more preferably at least 6, in a linear chain between the isocyanate groups. An example of a linear aliphatic diisocyanate is 1,6-hexamethylene diisocyanate. Optionally, additional carbon atoms can be present in side groups attached to the linear chain. Another preferred diisocyanate having the same reactivity between the isocyanates is bis(4-isocyantocyclohexyl) methane. Example of a diisocyanate having different reactivity between the isocyanate groups include, but are not limited to, isophorone diisocyanate and 2-ethyl-1,3-hexanediisocyanate. In one embodiment, the diisocyanate is soft. By soft, it is meant that the diisocyanate is non-aromatic, non-rigid, and does not contain isocyanurates, ureido diones, allophonates, or biurets.

The chain extension agent having at least difunctional reactivity with an isocyanate has at least two reactive groups that react with isocyanate groups. Preferably, there are 2 reactive groups per chain extension agent. Preferably, the reactive groups are hydroxyl, amine, thiol, and combinations thereof. More preferably, the reactive groups are hydroxyl. Optionally, the material can have a pendant alkyl chain. The pendant alkyl chain is the portion of the molecule that is located beyond where the reactive group attaches to the diisocyanate. Also, the chain extension agent may contain heteroatoms, such as O, N, and Si.

The reactive groups of the chain extension agent are placed on the molecular structure such that each reactive group can have the same reactivity or a different reactivity with respect to the other reactive groups. When the groups have different reactivity, at least two of the groups have a different reactivity with respect to the other reactive groups. When there are more than two reactive groups, some of the groups can have the same reactivity with respect to each other and a different reactivity with respect to other groups. In the case where the reactive groups of the chain extension agent are the same type (i.e. they are all amine or alcohols) or when the carbons attached to the reactive group have the same degree of substitution, the reactivity of the reactive groups of the chain extension agent with respect to the other reactive groups will be about the same. When there is a different degree of substitution on the carbon attached to the reactive group and/or their type of substitutions are different (i.e., aromatic versus aliphatic), the reactivity of the reactive groups will be different. When the reactive groups are amine groups, in addition to the attachment of the amine group to the different carbon atoms, a difference in reactivity can be obtained by changing the substituents on the amine group itself.

Examples of the chain extension agent with at least two functional groups that have different reactivity with respect to each other include, but are not limited to, 2-ethyl-1,3 hexanediol, 2-methyl-2,4-pentane diol, 2,2,4-trimethyl-1,3-pentanediol, 2,4-diethyl-1,5-octanediol, 1-hydroxymethyl cyclohexan-4-ol, 1-amino-hexan-6-ol, 2-ethyl-3-N-methyl-1,3-hexanediamine, isomers of these materials, and mixtures thereof. Examples of the chain extension agent with at least two functional groups that have the same reactivity with respect to each other include, but are not limited to, 1,6-hexane diol and 1,10-decane diol.

In a preferred embodiment, the chain extension agent has two hydroxyl groups that have different reactivity. Preferably, there is a difference in the degree of substitution on the carbons that are attached to the hydroxy groups.

For the reaction product, at least one of the following conditions is present: i) the isocyanate groups of the diisocyanate have a different reactivity in relation to each other, and ii) at least two of the groups with reactivity with an isocyanate on the chain extension agent have a different reactivity in relation to each other. Preferably, the isocyanate groups of the diisocyanate have the same reactivity in relation to each other and at least two of the groups with reactivity with an isocyanate on the chain extension agent have a different reactivity in relation to each other.

A preferred reaction product can be represented by the following structure: (material)-(diisocyanate)-(chain extension agent-diisocyanate)$_m$-(material), wherein m is any number that is at least 1 and is based on an average of all reaction products, and material is defined above. In this preferred reaction product, the primary carbamate groups of the material are the terminal ends of the reaction product.

In a preferred embodiment, the ratio of urethane structures to ester structures in the reaction product is at least 2:1. More preferably, the ratio of urethane structures to ester structures is at least 4:1, with 4:1 being preferred.

Preferably, the reaction product has a glass transition temperature, $T_g$, that is less than or equal to about 60° C., more preferably less than or equal to about 40° C., and more preferably less than or equal to about 30° C. One way to provide this $T_g$ is with a low $T_g$ polyisocyanate, which can be determined by reacting the polyisocyanate with methanol to form a product and then measuring the $T_g$ of the product.

In a preferred embodiment, the reaction product has a number average molecular weight of about 524 to about 4000. More preferably, the reaction product has a number average molecular weight of less than about 1500.

The composition of the present invention has the flexibility benefits provided by the extending agent, but it minimizes the level of links that reduce etch resistance. For example, when polycaprolactone is used as the extending agent, the level of ester links is reduced.

The present invention also provides a method for making the reaction product, which comprises reacting the diisocyanate, the chain extension agent having at least difunctional reactivity with an isocyanate, and the material comprising a blend of i) the primary carbamate material having at least one functional group reactive with an isocyanate and at least one primary carbamate group or a group convertible to a primary carbamate group, and ii) the reaction product of the primary carbamate material with an extending agent, wherein at least one of i) the isocyanate groups of the diisocyanate have a different reactivity in relation to each other, and ii) at least two of the groups with reactivity with an isocyanate on the chain extension agent have a different reactivity in relation to each other. The reacting is one of: a) reacting the diisocyanate, the chain extension agent, and the material together in one reaction, b) reacting the diisocyanate with the chain extension agent to form a reaction product A, and then reacting reaction product A with the material, and c) reacting the material with the diisocyanate to form a reaction product B, and then reacting reaction product B with the chain extension agent.

The reaction of the reaction materials can be started with a catalyst. The catalyst can be any catalyst in any amount that facilitates the reaction of the reaction materials. Examples of the catalyst include, but are not limited to, stannous octoate, octanoic acid, dibutyl tin dilaurate, dibutyl tin oxide, and weak acids.

The reaction can optionally take place in the presence of a solvent. The solvent can be any solvent in any amount that solubilizes the reaction materials. Examples of the solvent include, but are not limited to, organic solvents, polar organic solvents, polar aliphatic solvents, polar aromatic solvents, ketones, esters, acetates, aprotic amides, aprotic sulfoxides, aprotic amines, toluene, xylene, methyl ethyl ketone, methyl isobutyl ketone, m-amyl acetate, ethylene glycol butyl ether acetate, propylene glycol monomethyl ether acetate, n-methylpyrrolidone, and blends of aromatic hydrocarbons.

In a preferred reaction, based on a total weight of the reaction materials, an amount of the second material having at least one functional group reactive with an isocyanate and at least one primary carbamate group or a group convertible to a primary carbamate group ranges from about 20 to about 40%, an amount of a first material having difunctional selective reactivity with an isocyanate ranges from about 10 to about 30%, and an amount of diisocyanate ranges from about 40 to about 60%.

Generally, the reaction temperature is controlled in a range from about 0° C. to about 110° C., preferably from about 20° C. to about 90° C. The amount of catalyst generally ranges from about 0.01 to about 1% by weight of the total weight of the reaction materials. The amount of solvent generally ranges in an amount such that the reaction product is from about 10 to about 90% non-volatiles. The reaction is generally taken to greater than 90% completion as measured by NCO content.

One non-limiting example of a composition of the present invention comprises a molecule of the following structure:

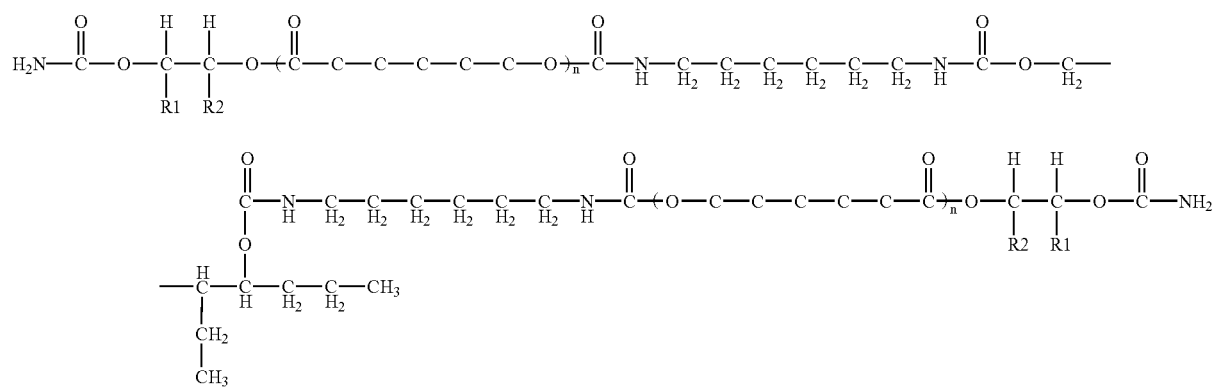

wherein $R_1$, $R_2$, and n are defined above.

Another non-limiting example of a composition of the present invention comprises a molecule of the following structure:

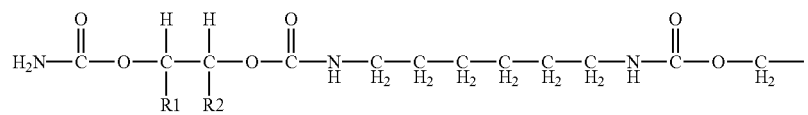

-continued

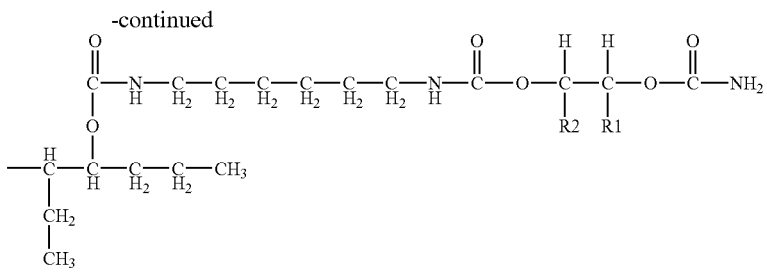

wherein $R_1$ and $R_2$ are defined above.

Another non-limiting example of a composition of the present invention comprises a molecule of the following structure:

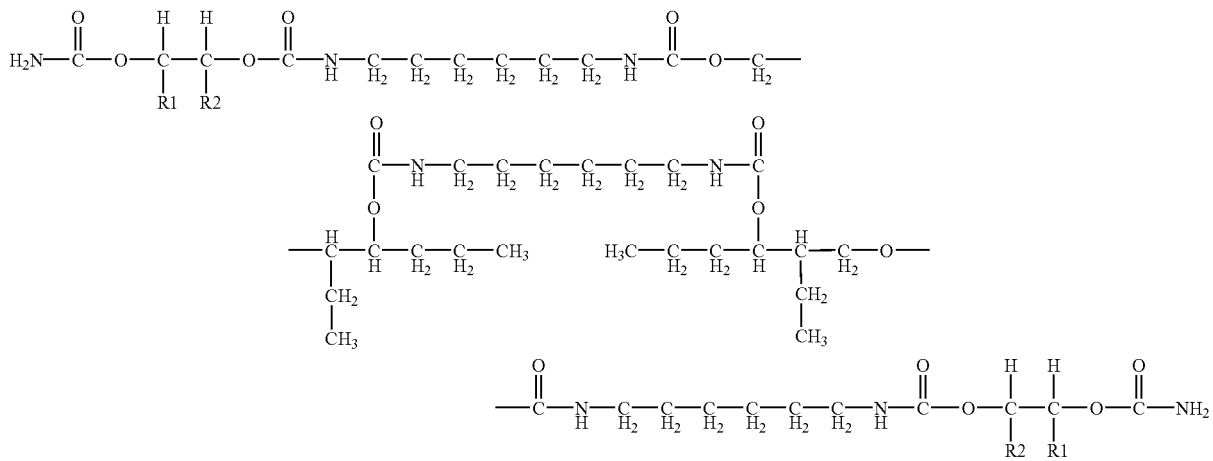

wherein $R_1$ and $R_2$ are defined above.

The composition of the present invention can further include additional polymers. Examples of the additional polymer include, but are not limited to, an acrylic, a vinyl, a polyurethane, a polycarbonate, a polyester, an alkyd, and a polysiloxane.

The compositions of the present invention can be included in coating compositions. The coating composition can include, but is not limited to, materials described below. The coating composition can be used as any layer in a coating, which includes, but is not limited to, electrodeposition coating, primer, base coat, top coat, clearcoat, and laminate.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these.

Examples of useful solvents include, but are not limited to, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be applied on an article/substrate by any of a number of techniques well-known in the art. These include, for example, spray coating, dip coating, roll coating, curtain coating, and the like. For automotive body panels, spray coating is preferred.

Additional agents, for example crosslinkers, surfactants, fillers, stabilizers, wetting agents, dispersing agents, adhesion promoters, UV absorbers, hindered amine light stabilizers, etc. may be incorporated into the coating composition. A preferred crosslinker is an aminoplast. Preferably, the aminoplast is based on melamine or benzoquanamine. Preferred aminoplast resins are melamine formaldehyde resins (including monomeric or polymeric melamine resins and partially or fully alkylated melamine resins) or urea formaldehyde resins.

While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, a coloring agent can be added to the coating composition. Examples of the coloring agent include, but are not limited to, any organic or inorganic compounds or colored materials, fillers, metallic or other inorganic flake materials such as mica or aluminum flake, and other materials of kind that the art normally includes in such coatings. Coloring agents and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may be any of a number of types well-known in the art. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups.

Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range from 90° C. to 180° C. The first compounds according to the present invention are preferably reactive even at relatively low cure temperatures. Thus, in a preferred embodiment, the cure temperature is preferably from 115° C. to 150° C., and more preferably at temperatures from 115° C. to 140° C. for a blocked acid catalyzed system. For an unblocked acid catalyzed system, the cure temperature is preferably from 80° C. to 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

Compositions of the present invention can provide coatings with improved properties. The flex that can be obtained ranges from about 8 to about 10 as measured by test method General Motors GM9503P. Also, the etch that can be obtained ranges from about 2 to about 8 as measured by test method General Motors World Specification GM W-3005 paragraph 5.15, and more preferably ranges from about 2 to about 6.

SPECIFIC EMBODIMENTS OF THE INVENTION

The invention is further described in the following examples. The examples are merely illustrative and do not in any way limit the scope of the invention as described and claimed. All parts are parts by weight unless otherwise noted.

EXAMPLE 1

A reactor equipped with an agitator, a thermocouple, and a nitrogen gas inlet was charged with 989.1 g of ε-caprolactone, 512.2 g of hydroxypropyl carbamate, 8.7 g toluene, and 3.8 g stannous octoate in 33.2 g toluene. The mixture was heated to 130° C. and that temperature was maintained for 1.5 hours. The reaction product was cooled to 23° C. and 954.6 g of propylene glycol monomethyl ether acetate and 1.3 g dibutyltin dilaurate were added. Next, 323.7 g of 2-ethyl-1,3-hexane diol, 746.7 g of 1,6-diisocyanto hexane, 32.9 g of isobutanol, and 122.2 g of propylene glycol monomethyl ether acetate were added. The 1,6-diisocyanto hexane was added stepwise in ⅙ amounts.

EXAMPLE 2

A reactor equipped with an agitator, a thermocouple, and a nitrogen gas inlet was charged with 820.7 g of ε-caprolactone, 571.2 g of hydroxypropyl carbamate, 9.6 g toluene, and 2.44 g stannous octoate in 11.7 g toluene. The mixture was heated to 130° C. and that temperature was maintained for 2 hours and 10 minutes. The reaction product was cooled to 21° C. and 960.2 g of propylene glycol monomethyl ether acetate and 1.25 g dibutyltin dilaurate were added. Next, 350.5 g of 2-ethyl-1,3-hexane diol, 826.7 g of 1,6-diisocyanto hexane, 35.8 g of isobutanol, and 110.4 g of propylene glycol monomethyl ether acetate were added. The 1,6-diisocyanto hexane was added stepwise in ⅛ amounts.

EXAMPLE 3

A reactor equipped with an agitator, a thermocouple, and a nitrogen gas inlet was charged with 839.4 g of hydroxypropyl carbamate, 889.2 g of propylene glycol monomethyl ether acetate, 514.6 g of 2-ethyl-1,3-hexane diol, and 1.25 g of dibutyltin dilaurate. The reaction mixture was heated to 60° C., then stepwise, 1211.4 g of 1,6-diisocyanto hexane were added. The reaction mixture was then heated to 80° C. and 197 g of propylene glycol monomethyl ether acetate was added. Then, 53.9 g of isobutanol, and 342.7 g of isopropanol were added.

EXAMPLE 4

A reactor equipped with an agitator, a thermocouple, and a nitrogen gas inlet was charged with 569.65 g of hydroxypropyl carbamate, 699.83 g of propylene glycol monomethyl ether acetate, 699.7 g of 2-ethyl-1,3-hexane diol, and 1.45 g of dibutyltin dilaurate. Stepwise, added ⅛ of the 1268.4 g of 1,6-diisocyanto hexane, then remaining amount was added in 1/16 amounts. Next, 358.8 g of propylene glycol monomethyl ether acetate and 67.64 g of isobutanol were added.

It should be appreciated that the present invention is not limited to the specific embodiments described above, but includes variations, modifications and equivalent embodiments defined by the following claims.

What is claimed is:

1. A composition comprising a reaction product of
   a. a diisocyanate comprising at least one of 1,6-hexamethylene diisocyanate, or bis(4-isocyantocyclohexyl) methane, or isophorone diisocyanate
   b. a chain extension agent having at least difunctional reactivity with an isocyanate, and
   c. a material comprising a blend of
      i. a primary carbamate material having at least one functional group reactive with an isocyanate and at least one primary carbamate group or a group convertible to a primary carbamate group,
      ii. a reaction product of the primary carbamate material (i) with an extending agent to form a prepolymer comprising repeating units of the extending agent, wherein the extending agent is a material that is reactive with the at least one of the functional groups of c (i) that is reactive with isocyanate and wherein the reaction product has at least one primary carbamate group or a group convertible to a primary carbamate group,
   wherein at least one of the following conditions are met in that the isocyanate groups of the diisocyanate have a different reactivity in relation to each other, or at least two of the groups with reactivity with an isocyanate on the chain extension agent have a different reactivity in relation to each other, and wherein b) and c) are reactive with a).

2. The composition of claim 1, wherein the functional group reactive with an isocyanate on the primary carbamate material is at least one of a hydroxyl group or an amine group, or a thiol group.

3. The composition of claim 1, wherein the primary carbamate material is at least one of a hydroxyalkyl primary carbamate or a ring opened glycerine carbonate, or an allyl alcohol reaction product.

4. The composition of claim 1, wherein the primary carbamate material is represented by the following structure:

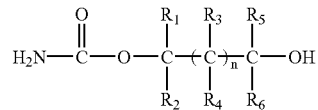

wherein R1, R2, R3, R4, R5, and R6 are each independently H or C1–C6 alkyl, and n is 0 or a positive integer.

5. The composition of claim 1, wherein the primary carbamate material is at least one of hydroxy ethyl carbamate, or hydroxy propyl carbamate, or hydroxy butyl carbamate.

6. The composition of claim 1, wherein the extending agent is at least one of a lactone or a hydroxy carboxylic acid.

7. The composition of claim 1, wherein the extending agent is ε-caprolactone.

8. The composition of claim 1, wherein in the blend, the primary carbamate material is present in an amount from about 10% to about 90% based on the equivalents of primary carbamate groups.

9. The composition of claim 1, wherein in the reaction product of the primary carbamate material c(ii) and the extending agent, there are from 1 to 20 extending agents connected to each other per primary carbamate material based on an average of all reaction product molecules.

10. The composition of claim 1, wherein in the reaction product c (ii) of the primary carbamate material and the extending agent, there are from 1 to 3 extending agents connected to each other per primary carbamate material based on an average of all reaction product molecules.

11. The composition of claim 1, wherein in the reaction product c(ii) of the primary carbamate material and the extending agent, there is 1 extending agent per primary carbamate material.

12. The composition of claim 1, wherein the chain extension agent has two functional groups reactive with an isocyanate.

13. The composition of claim 1, wherein the functional group reactive with an isocyanate on the chain extension agent is at least one of hydroxyl, amine, or thiol.

14. The composition of claim 1, wherein the chain extension agent has two hydroxyl groups.

15. The composition of claim 1, wherein the chain extension agent contains a heteroatom.

16. The composition of claim 1, wherein the chain extension agent is selected from the group consisting of 2-ethyl-1,3 hexanediol; 2-methyl-2,4-pentane diol; 2,2,4-trimethyl-1,3-pentanediol; 2,4-diethyl-1,5-octanediol; 1-hydroxymethyl cyclohexan-4-ol; 1-amino-hexan-6-ol; 2-ethyl-3-N-methyl-1,3-hexanediamine; isomers of the preceding materials; 1,6-hexane diol; 1,10-decane diol; and mixtures thereof.

17. The composition of claim 1, wherein the isocyanate groups of the diisocyanate have the same reactivity in relation to each other, and at least two of the groups with reactivity with an isocyanate on the chain extension agent have a different reactivity in relation to each other.

18. The composition of claim 1, wherein the isocyanate groups of the diisocyanate have the same reactivity in relation to each other, and the chain extension agent has two groups with reactivity with an isocyanate and each group has a different reactivity in relation to the other.

19. The composition of claim 1, wherein the reaction product of a), b) and c) has a $T_g$ of less than or equal to about 60° C.

20. The composition of claim 1, wherein the reaction product of a), b) and c) has a structure represented by (material)-(diisocyanate)-(chain extension agent -diisocyanate)$_m$-(material), wherein m is any number that is at least 1 and is based on an average of all reaction products, and wherein primary carbamate groups of the material are terminal ends of the reaction product.

21. The composition of claim 1, wherein the reaction product of a), b) and c) has a number average molecular weight of about 524 to about 4000.

22. The composition of claim 1 further comprising a polymer that is at least one of an acrylic, a vinyl, a polyurethane, a polycarbonate, a polyester, an alkyd, or a polysiloxane.

23. A method for forming the composition of claim 1, comprising one of:
   a. reacting the diisocyanate, the chain extension agent, and the material together in one reaction,
   b. reacting the diisocyanate with the chain extension agent to form a reaction product A, and then reacting reaction product A with the material, or
   c. reacting the material with the diisocyanate to form a reaction product B, and then reacting reaction product B with the chain extension agent.

24. A coating composition comprising the composition of claim 1.

25. The coating composition of claim 24 further comprising at least one of a crosslinker, a solvent, a catalyst, a surfactant, a filler, a stabilizer, a wetting agent, a dispersing agent, an adhesion promoter, a UV absorber, a hindered amine light stabilizer, a coloring agent, or an additional polymer.

26. The coating composition of claim 25, wherein the crosslinker is an aminoplast.

27. A method comprising applying the coating composition of claim 24 to a substrate.

28. A coating prepared from the coating composition of claim 24.

29. The coating of claim 28, wherein the coating is at least one of a primer, a base coat, a top coat, or a clearcoat.

30. The coating of claim 28, wherein the coating has flex of from about 8 to about 10 as measured by General Motors GM9503P.

31. The coating of claim 28, wherein the coating has an etch of from about 2 to about 8 as measured by General Motors World Specification GMW-3005 paragraph 5.15.

32. A composition comprising a reaction product of
   a. a diisocyanate comprising 1,6-hexamethylene diisocyanate,
   b. a chain extension agent having at least difunctional reactivity with an isocyanate, and
   c. a material comprising a blend of
   i. a primary carbamate material having at least one functional group reactive with an isocyanate and at least one primary carbamate group or a group convertible to a primary carbamate group,
   ii. a reaction product of the primary carbamate material (i) with an extending agent to form a prepolymer comprising repeating units of the extending agent, wherein the extending agent is a material that is reactive with the at least one of the functional groups of c (i) that is reactive with isocyanate and wherein the reaction product has at least one primary carbamate group or a group convertible to a primary carbamate group, wherein at least two of the groups with reactivity with an isocyanate on the chain extension agent have a different reactivity in relation to each other, and wherein b) and c) are reactive with a) wherein the reaction product is at least one of:

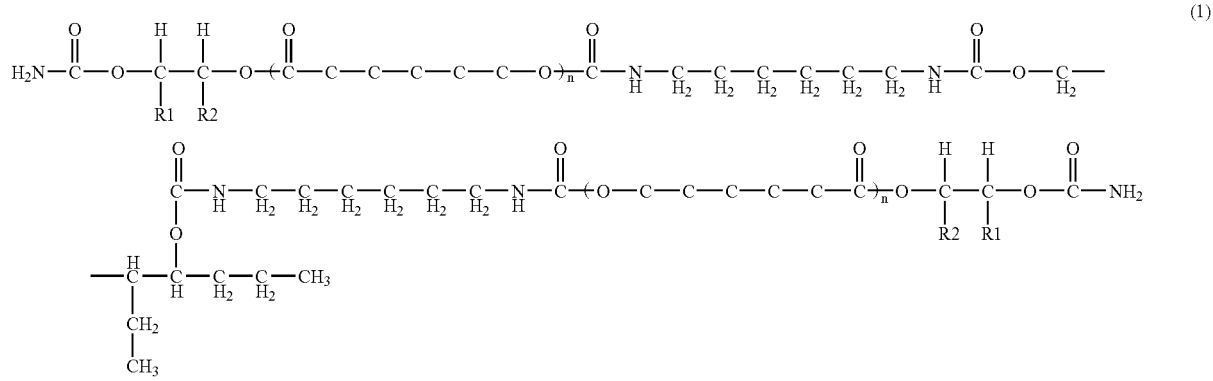

(1)

or

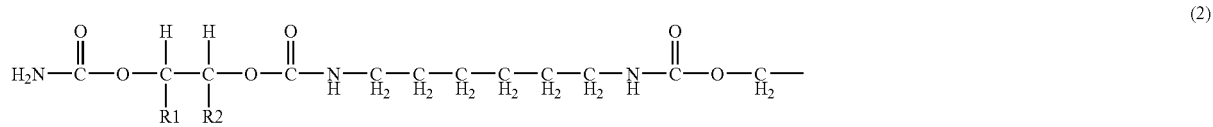

(2)

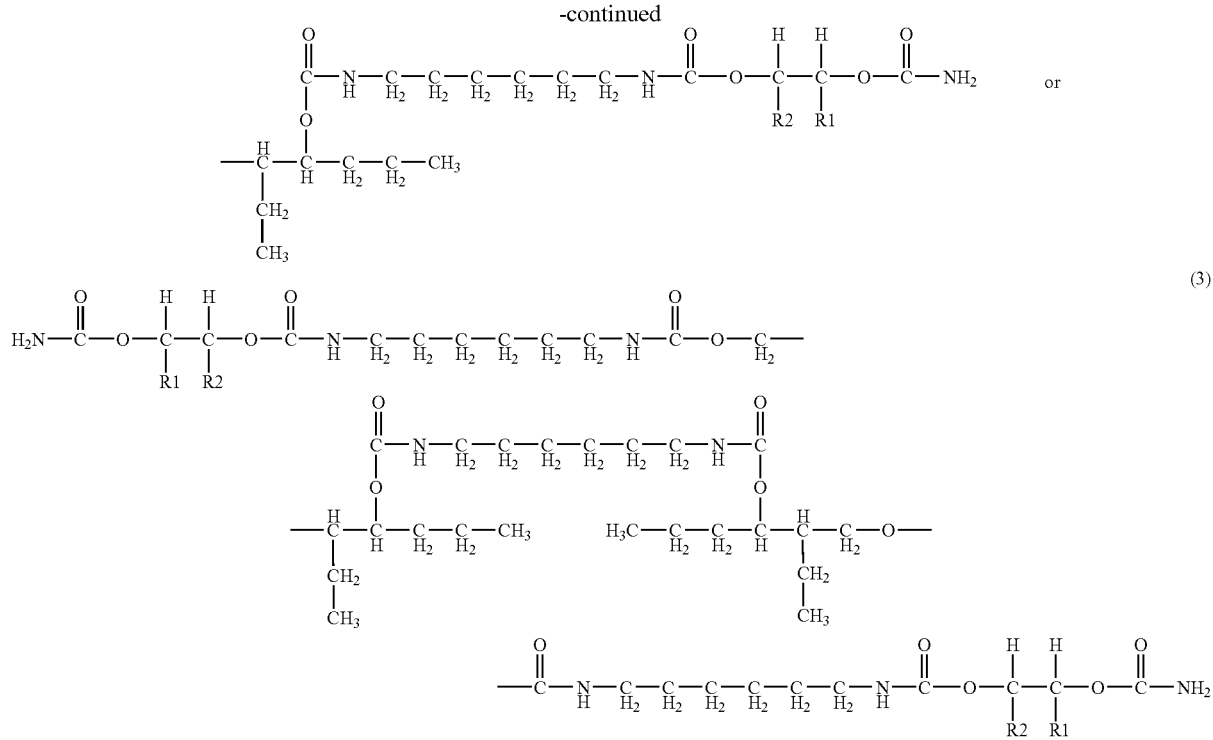
wherein $R_1$ and $R_2$ are each independently H or $C_1$ to $C_6$ alkyl, and n is a number from 1 to 20.
* * * * *